Oct. 22, 1935.  C. C. WHITTIER  2,018,478
MACHINE FOR MAKING CHEMICAL ASBESTOS
Filed Jan. 16, 1933
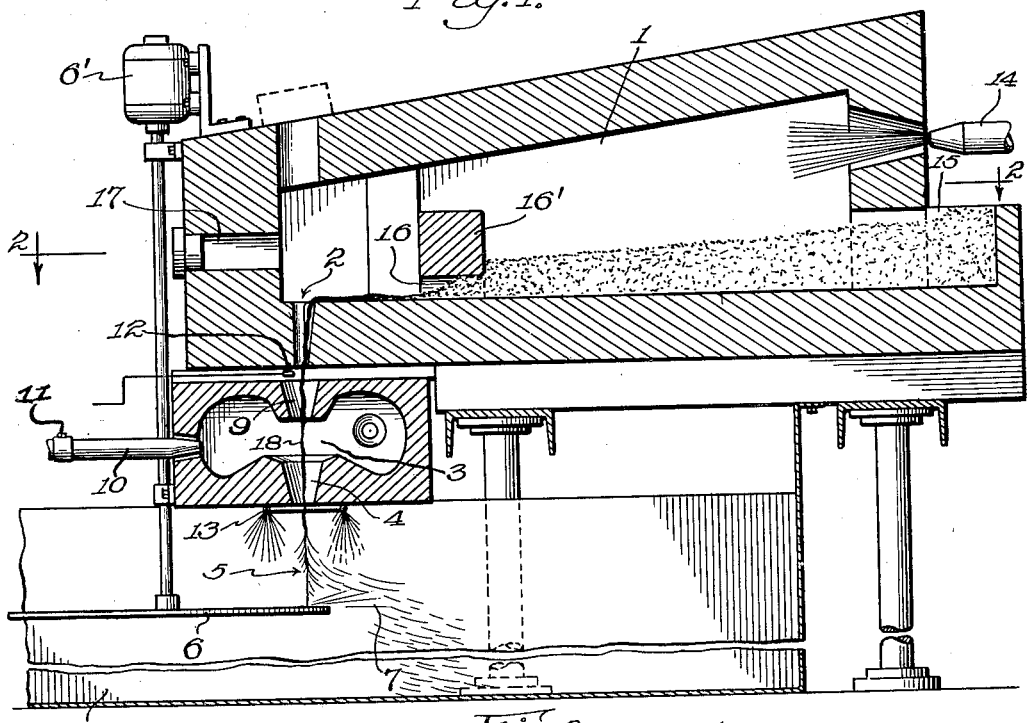
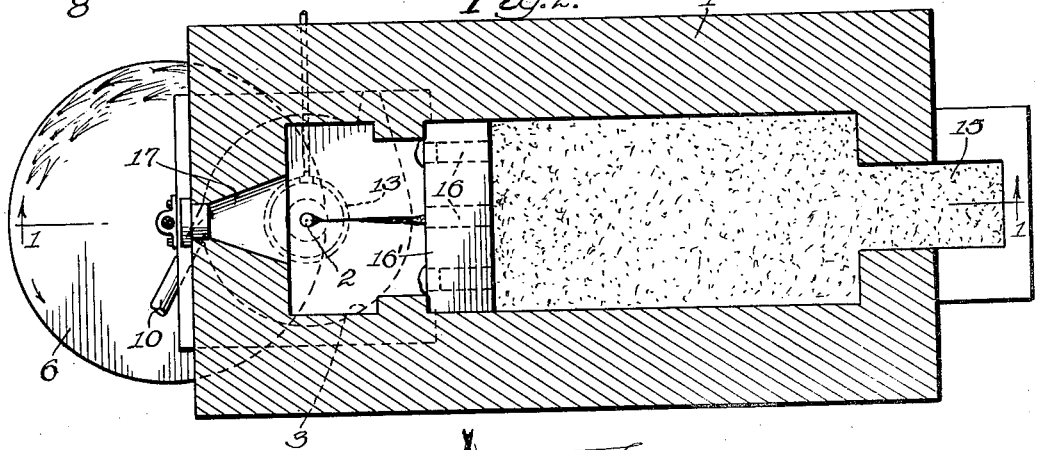
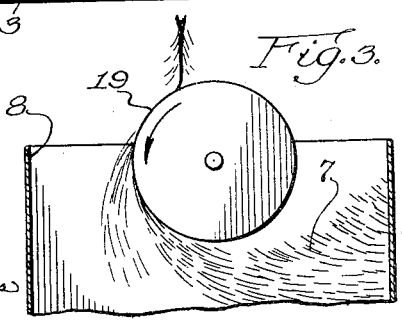
Inventor
Charles C. Whittier Patented Oct. 22, 1935

2,018,478

UNITED STATES PATENT OFFICE 2,018,478

MACHINE FOR MAKING CHEMICAL ASBESTOS

Charles C. Whittier, Chicago, Ill.

Application January 16, 1933, Serial No. 652,093

2 Claims. (Cl. 49—1)

This invention relates to a new and useful filamentary material and to methods and means for producing same, and more especially to artificial asbestos or chemically new asbestos-like fibers and to efficient continuous-process methods and mechanisms or means for manufacturing such material or product.

The main objects of the invention are to artificially product a fibrous mineral product or material having substantially all of the desirable attributes of natural asbestos fiber in its various forms, and to provide such a product of superior quality and better adapted for various purposes for which natural asbestos is used, and also for many other purposes for which natural asbestos is not adapted; including especially insulating and textile commodities; to produce a tempered and more flexible fiber of greater strength and toughness; to combine synthetically, in suitable proportions, appropriate materials mainly of natural source and to so treat the same as to accomplish the foregoing purposes and thus produce a product having the desired qualities herein set forth; and to provide means adapted for continuous-process operation whereby the product herein described may be produced or manufactured commercially and of satisfactory quality and in sufficient volume to meet practical industrial and commercial needs.

Means adapted for carrying out the purposes and for manufacturing the product herein described are illustrated by the accompanying drawing, in which:

Figure 1 is a vertical sectional view of a mineral fusing furnace having combined therewith appropriate heat regulating means and suitable mechanism to cause and effect drawing of filaments from the molten material treated.

Fig. 2 is a plan substantially on the line 2—2 of Fig. 1.

Fig. 3 is a side view of a modified form of filament drawing rotor.

Referring to said drawing, the process as a whole may be briefly described by stating that raw material, comprising the several necessary elements or minerals, is fed into the fusing furnace chamber 1 from which it flows by gravity through the outlet 2 and falls in a stream through a temperature controlling chamber 3, and thence downward through the opening 4 into an open space or chamber 5 where it is submitted to the frictional attack of a rapidly moving gaseous atmosphere as for instance air, certain parts of the material being immediately drawn off in filamentary form into the atmosphere, and the remainder falling upon a rapidly moving carrier 6, preferably of rotor design, whereby the material carried thereon is further submitted to the frictional attack of the atmosphere and further drawn off in filamentary form; said carrier as shown in Figs. 1 and 2 being in discoidal form and rotated horizontally, whereby the material deposited thereon or part of it is hurled centrifugally outward in liquid form whereby it is still further acted upon frictionally and parts or substantially all of the remaining material is drawn off by the atmosphere in filamentary form. All of the filaments 7, upon passing into the atmosphere, congeal and become set in permanent filament or fiber form and thereupon settle by gravity and collect feltwise in the chamber 8 which surrounds and extends below the carrier. The rotor 6 is driven by a motor 6'.

The fibrous or filamentary material 7 thus collected is removed in any convenient way and may be packaged or baled in any desired manner ready for storage or shipment, as will be understood, or it may be conveyed directly to any point whereon wanted, as for utilization in the industrial arts or for other purposes.

The said chamber 3 is annuloidal in shape and is positioned horizontally with the inlet and outlet openings 9 and 4 in vertical coaxial alinement therewith. Fuel is admitted in a somewhat tangential direction through a burner jet 10 having a delicately responsive control valve 11. This valve is regulated automatically by a pyrometric thermostat 12 or the like positioned adjacent to the path of the molten mineral as it passes from chamber 1 to chamber 3, the said thermostat and valve being responsively connected, as understood in the temperature control art, as for instance by electrical means not fully shown.

In order to temper the resultant fibers and so enhance their toughness and flexibility and corresponding fitness for fabrication and textile purposes and the like, an oil spray pressure jet or series of jets 13 are mounted to discharge oil vapor into the filament drawing air and against the hot filaments as they are formed.

The component elements in this new filamentary product are substantially those found in natural asbestos but may be varied considerably in their relative proportions, and other elements may be added to impart particular or special characteristics, as for instance coloring oxides, etc. Fusing together appropriate natural minerals is sufficient for the main purposes. It has been found, for instance, that a very good quality of asbestos fiber may be obtained by combining and treating certain materials as follows: alumina 27%; lime 22%; magnesia 17%; and silica 34%. This results in a light colored product consisting of fine flexible fibers or filaments. Appropriate metallic oxides may be added in small proportions to produce desired colors, as for instance iron oxide.

A very good asbestos may be obtained by chemically combining by heat ordinary natural dolomite and clay in appropriate proportions, the clay containing 25% or more of alumina. See Bulletin 95 (1920) of the Department of the Interior, Bureau of Mines, page 225, regarding dolomite.

In case the necessary materials are readily available, a good asbestos may be made advantageously by combining magnesium limestone, bauxite and silica, or by combining silica, magnesite and hematite.

nants as may occur are reprocessed, or they may be used for other purposes, as for instance ground for use as an abrasive, so there is no waste of material.

Referring to the modified construction shown in Figure 3, the rotor 19 here shown is mounted on a horizontal axis and the molten mineral falls upon the broad cylindriform face thereof; the operative effect on the mineral being substantially the same as results from using the form shown in Figures 1 and 2.

The specific quality and size of the asbestos fibers may be varied somewhat according to the purpose for which they are to be used by varying the temperature and fluidity of the molten stream as it passes through the temperature adjustment chamber.

It is to be understood that some of the details set forth may be at different proportions or which departing from the spirit of the invention is described by the following claims: